United States Patent [19]
Duggan et al.

[11] Patent Number: 5,746,658
[45] Date of Patent: May 5, 1998

[54] ANTI-ROTATION RETAINER FOR UNIVERSAL JOINT

[75] Inventors: James A. Duggan, Temperance, Mich.; Ray A. Gall, Toledo, Ohio

[73] Assignee: Dana Corporation, Toledo, Ohio

[21] Appl. No.: 626,729

[22] Filed: Apr. 1, 1996

Related U.S. Application Data

[60] Continuation-in-part of Ser. No. 459,939, Jun. 5, 1995, Pat. No. 5,620,374, which is a division of Ser. No. 364,176, Dec. 27, 1994, which is a continuation-in-part of Ser. No. 696,229, May 6, 1991, Pat. No. 5,376,051.

[51] Int. Cl.[6] ............................................. F61D 3/26
[52] U.S. Cl. .................................................. 464/130
[58] Field of Search ................................ 464/130, 128, 464/134, 136; D11/3-6

[56] References Cited

U.S. PATENT DOCUMENTS

| | | |
|---|---|---|
| 135,809 | 2/1873 | Hubbard . |
| 253,886 | 2/1882 | Over . |
| 454,289 | 6/1891 | Partz . |
| 549,529 | 11/1895 | Pfeiffer et al. . |
| 673,032 | 4/1901 | Servis . |
| 1,037,384 | 9/1912 | White . |
| 1,453,507 | 5/1923 | Kimball . |
| 1,853,300 | 4/1932 | Cutting . |
| 1,989,832 | 2/1935 | Swenson . |
| 1,993,357 | 3/1935 | Braun et al. . |
| 2,020,253 | 11/1935 | Braun . |
| 2,072,176 | 3/1937 | Monroe . |
| 2,114,861 | 4/1938 | Slaght . |
| 2,273,920 | 2/1942 | Anderson . |
| 2,299,001 | 10/1942 | Anderson . |
| 2,773,368 | 12/1956 | Slaght . |
| 3,074,255 | 1/1963 | Reinecke . |
| 3,353,374 | 11/1967 | Buthenoff ................ 464/130 X |
| 3,824,808 | 7/1974 | Mangiavacchi . |
| 4,505,689 | 3/1985 | Mazziotti . |
| 4,575,361 | 3/1986 | Thatcher . |
| 4,682,972 | 7/1987 | Olschewski . |
| 4,768,995 | 9/1988 | Mangiavacchi ............ 464/135 |
| 4,861,314 | 8/1989 | Mazziotti ................... 464/130 |

FOREIGN PATENT DOCUMENTS

| | | | |
|---|---|---|---|
| 222769 | 8/1958 | Australia . | |
| 320229 | 6/1989 | European Pat. Off. . | |
| 768522 | 5/1934 | France ............................. | D11/3 |
| 166717 | 9/1984 | Japan . | |
| 705009 | 3/1954 | United Kingdom . | |
| 789480 | 1/1958 | United Kingdom . | |
| 1205202 | 9/1970 | United Kingdom . | |

*Primary Examiner*—Daniel P. Stodola
*Assistant Examiner*—Emmanuel M. Marcelo
*Attorney, Agent, or Firm*—MacMillan, Sobanski & Todd

[57] ABSTRACT

A universal joint assembly includes a yoke having an arm with an opening formed therethrough. A bearing cup is mounted on an outwardly extending trunnion of a cross. The bearing cup includes an outer circumferential surface and an end surface. The circumferential surface is received within the yoke arm opening. A retainer clip includes a base portion secured to the yoke arm and an end portion extending over a portion of the end surface of the bearing cup. A retainer element is placed between the end portion of the retainer clip and the end surface of the bearing cup to provide an interference fit to prevent the bearing cup from rotating relative to the yoke arm. If desired, a depression can be formed in the end surface of the bearing cup to seat the retainer element.

10 Claims, 6 Drawing Sheets

ANTI-ROTATION RETAINER FOR UNIVERSAL JOINT

CROSS REFERENCE TO RELATED APPLICATIONS

This application is a continuation-in-part of Ser. No. 08/459,939 filed Jun. 5, 1995, now U.S. Pat. No. 5,620,374 issued Apr. 15, 1997, which is a division of Ser. No. 08/364,176 filed Dec. 27, 1994, which is a continuation-in-part of Ser. No. 07/696,229 filed May 6, 1991, now U.S. Pat. No. 5,376,051 issued Dec. 27, 1994.

BACKGROUND OF THE INVENTION

This invention relates in general to universal joints and in particular to an improved structure for restraining the bearing cups mounted on a universal joint cross from rotating relative to an end yoke connected thereto during use.

Universal joints are well known devices which provide a driving connection between two members adapted to rotate about non-aligned axes of rotation. Universal joints of this type are widely used between rotatable drive shafts in vehicle drive train systems. Typically, such universal joints include a cross having a central body portion with four trunnions extending outwardly therefrom. The trunnions are oriented in a single plane and extend at right angles relative to one another. A bearing cup is mounted on the end of each of the trunnions. Needle bearings or similar means are provided between each of the trunnions and its associated bearing cup to permit the bearing cup to rotate relative to the trunnions. One pair of opposed bearing cups is connected to a first end yoke secured to the first drive shaft, while the other pair of opposed bearing cups is connected to a second end yoke secured to the second drive shaft.

When the axes of rotation of the two drive shafts are not co-axially aligned during operation, the bearing cups rotate relative to the trunnions in an oscillating fashion so as to permit the driving connection. It is desirable that the bearing cups be fixed in position relative to the end yokes connected thereto such that no relative rotation occurs therebetween. Otherwise, wear will occur in the end yokes and the outer surfaces of the bearing cups, causing premature failure of the universal joint. Many structures are known for preventing relative rotation from occurring between the bearing cups and the end yokes. For example, it is known to weld plates onto the end surfaces of the bearing cups and to bolt such plates to the end yoke. However, this structure, as well as other anti-rotation structures known in the art, requires extra parts and additional labor to install, thus increasing the cost and complexity of the universal joint. Furthermore, such an arrangement does not readily accommodate stack-up tolerances caused by the assembly of the various components. Accordingly, it would be desirable to provide an improved universal joint with an anti-rotation structure which is simple and inexpensive to construct and assemble, and which readily accommodates such stack-up tolerances.

SUMMARY OF THE INVENTION

The present invention includes a retain element adapted for use in a universal joint assembly to prevent bearing cups from rotating relative to an end yokes during use. The retainer element is selectively placed and trapped between a retainer clip and a bearing cup to provide an interference fit which prevents the bearing cup from rotating. The retainer element is economical to manufacture and install and can be used with known retainer clips.

In a preferred embodiment, a universal joint assembly includes a yoke having an arm with an opening formed therethrough. A bearing cup is mounted on an outwardly extending trunnion of a cross. The bearing cup includes an outer circumferential surface and an end surface. The circumferential surface is received within the yoke arm opening. A retainer clip includes a base portion secured to the yoke arm and an end portion extending over a portion of the end surface of the bearing cup. A retainer element is placed between the end portion of the retainer clip and the end surface of the bearing cup to provide an interference fit to prevent the bearing cup from rotating relative to the yoke arm. If desired, a depression can be formed in the end surface of the bearing cup to seat the retainer element.

Other objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
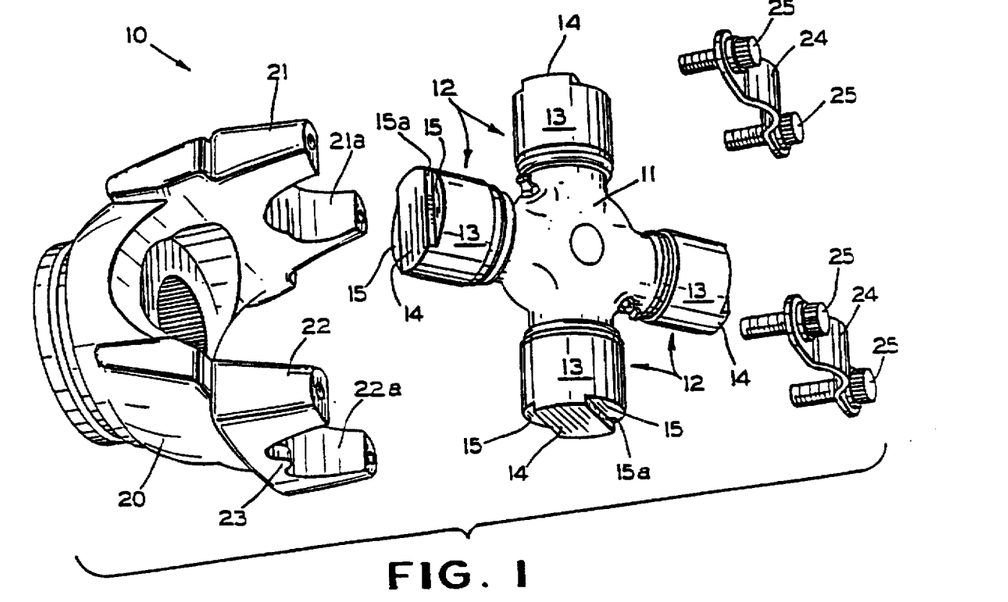
FIG. 1 is an exploded perspective view of a first embodiment of a universal joint assembly adapted for use with a half round end yoke in accordance with this invention.

Referring now to the drawings, there is illustrated in FIG. 1 an exploded perspective view of a first embodiment of a universal joint assembly, indicated generally at 10, in accordance with this invention. The assembly 10 includes a conventional cross member 11 having four trunnions extending radially outwardly in a common plane at right angles to one another. A bearing cup, indicated generally at 12, is mounted on the end of each of the trunnions. Needle bearings (not shown) or similar bearing means are provided between each of the bearing cups 12 and its associated trunnions to permit relative rotation therebetween.

Each of the bearing cups 12 is formed generally in the shape of a hollow cylinder having an outer circumferential surface 13 and a closed end surface 14. Two recessed areas 15 are formed in each of the end surfaces 14. The recessed areas 15 are defined by parallel chord lines extending to the circumferential edges of the bearing cup 12, although they may be defined by curved lines as well. Shoulders 15a are defined between recessed areas 15 and the end surfaces 14 of the bearing cups 12.

Figure 2:
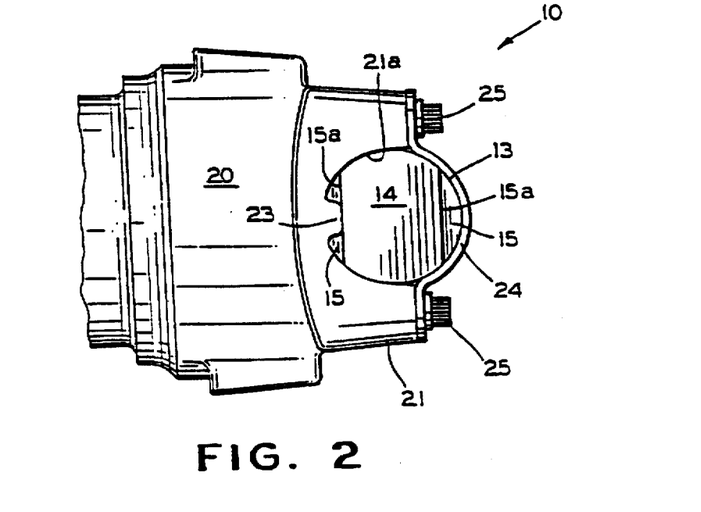
FIG. 2 is a plan view of the universal joint assembly illustrated in FIG. 1 shown assembled.

The illustrated assembly 10 further includes a first embodiment of a half round end yoke 20. The end yoke 20 includes a pair of arms 21 and 22 having semi-cylindrical recesses 21a and 22a formed therein. A tab 23 is formed integrally with each of the yoke arms 21 and 22. The tabs 23 extend over the ends of the respective semi-cylindrical recesses 21a and 21b. When the cross 11 is assembled to the end yoke 20, two opposed bearing cups 12 are received in the recesses 21a and 22a, as shown in FIG. 2. The tabs 23 extend over one of the recessed areas 15 formed in the end surfaces 14 of the bearing cups 12. The tabs 23 engage the one of the shoulders 15a formed on such end surfaces 14 so as to prevent rotation of the bearing cups 12 relative to the associated arms 21 and 22 of the end yoke 20. The tabs 23 may be formed having generally flat end surfaces for contacting the shoulders 15a.

Means are provided for retaining the bearing cups 12 within the semi-cylindrical recesses 21a and 22a of the end yoke 20. As shown in FIGS. 1 and 2, such means includes a pair of retainer straps 24. The central portions of the retainer straps 24 extend around respective portions of the outer circumferential surfaces 13 of the bearing cups 12. The end portions of the retainer straps 24 are secured to the arms 21 and 22 by threaded fasteners 25. Although there is some frictional engagement between the bearing cups 12 and the arms 21 and 22, such frictional engagement is not, of itself, sufficient to prevent relative rotation therebetween under all conditions. Thus, the cooperation of the tabs 23 with the shoulders 15a is provided to prevent such relative rotation.

Figure 3:
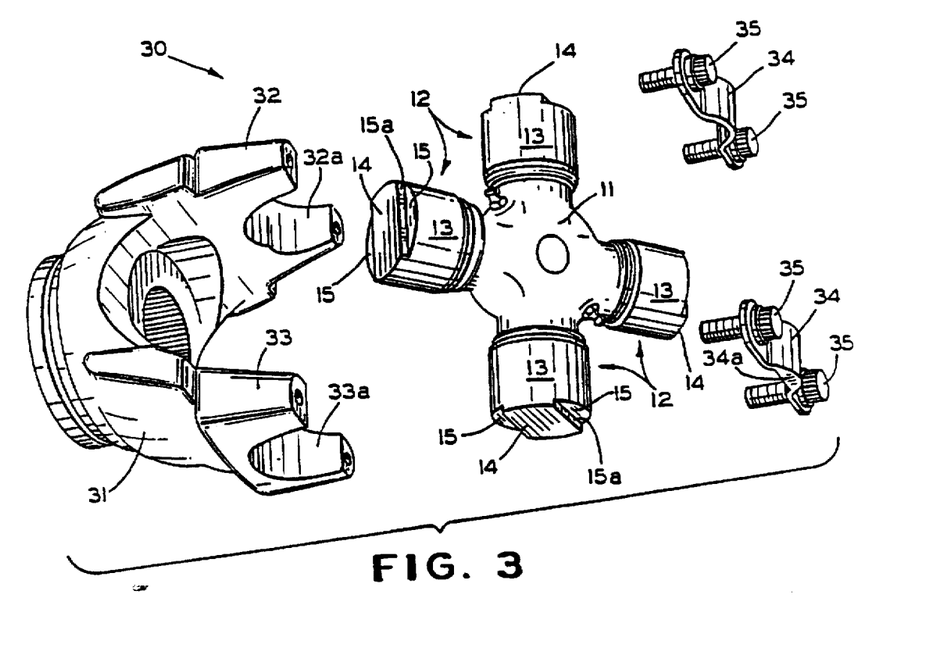
FIG. 3 is an exploded perspective view of a second embodiment of a universal joint assembly adapted for use with a half round end yoke in accordance with this invention.
Figure 4:
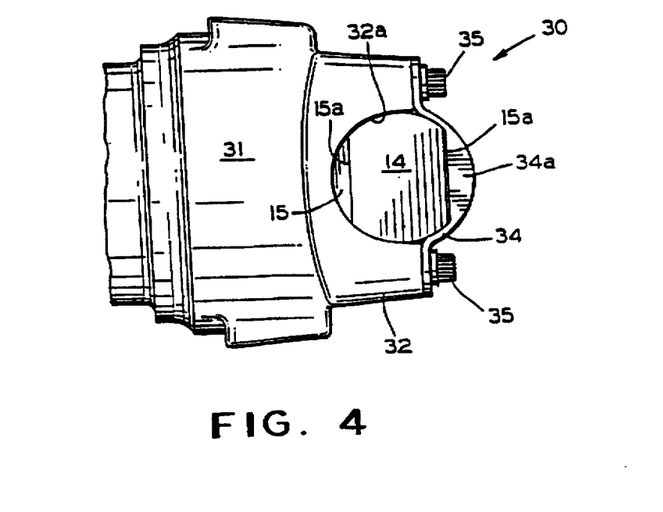
FIG. 4 is a plan view of the universal joint assembly illustrated in FIG. 3 shown assembled.

Referring now to FIGS. 3 and 4, there is illustrated a second embodiment of a universal joint assembly, indicated generally at 30, in accordance with this invention. The assembly 30 includes a conventional cross member 11 having bearing cups 12 mounted thereon, as described above in connection with FIGS. 1 and 2. The assembly 30 further includes a second embodiment of a half round end yoke 31. The end yoke 31 includes a pair of arms 32 and 33 having semi-cylindrical recesses 32a and 33a formed therein. When the cross 11 is assembled to the end yoke 31, two opposed bearing cups 12 are received in the recesses 32a and 33a, as shown in FIG. 4.

Means are provided for retaining the bearing cups 12 within the semi-cylindrical recesses 32a and 33a of the end yoke 31. As shown if FIGS. 3 and 4, such means includes a pair of retainer straps 34. The central portions of the retainer straps 34 are curved and extend around respective portions of the outer circumferential surfaces 13 of the bearing cups 12. The end portions of the retainer straps 34 are secured to the arms 32 and 33 by threaded fasteners 35. However, unlike the retainer straps 24 discussed above, each of the retainer straps 34 is provided with an integral flange 34a. The flanges 34a extend across portions of the curved central portions of the retainer straps 34, defining a plane which is perpendicular to the plane defined by the end portions. When the cross 11 is assembled to the end yoke 31, two opposed bearing cups 12 are received in the recesses 32a and 33a, as shown in FIG. 4. The flanges 34a extend over one of the recessed areas 15 formed in the end surfaces 14 of the bearing cups 12. The flanges 34a engage the one of the shoulders 15a formed on such end surfaces 14 so as to prevent rotation of the bearing cups 12 relative to the associated arms 32 and 33 of the end yoke 31.

Figure 5:
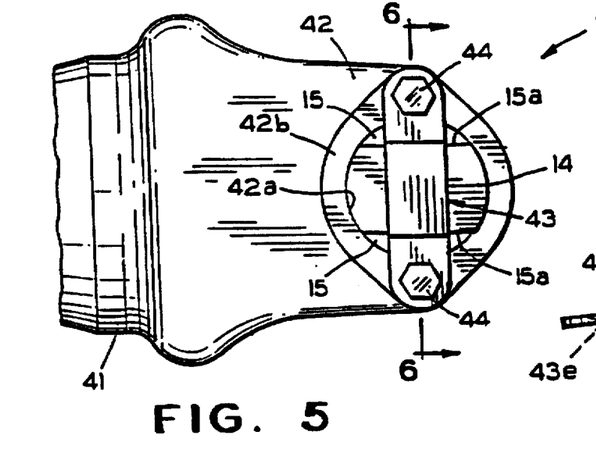
FIG. 5 is a plan view of a third embodiment of a universal joint assembly adapted for use with a full round end yoke in accordance with this invention.
Figure 6:
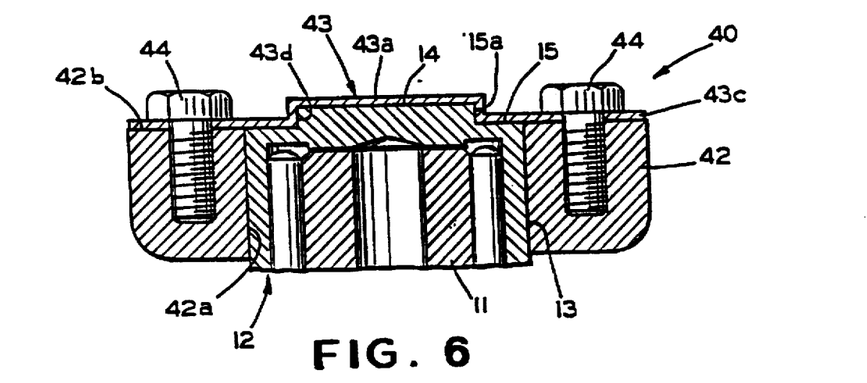
FIG. 6 is a sectional elevation view of the universal joint assembly illustrated in FIG. 5.

The embodiments described and illustrated thus far relate to universal joint assemblies adapted for use with half round end yokes. However, this invention also relates to universal joint assemblies adapted for use with full round end yokes. Referring now to FIGS. 5 and 6, there is illustrated a third embodiment of a universal joint assembly, indicated generally at 40, in accordance with this invention. The assembly 40 includes a conventional cross member 11 having bearing cups 12 mounted thereon, as described above in connection with FIGS. 1 and 2. The assembly 40 further includes a full round end yoke 41. The end yoke 41 includes a pair of arms (only one arm 42 is illustrated) having cylindrical openings 42a formed therethrough. A machined upper surface 42b is formed about each of the openings 42a. When the cross 11 is assembled to the end yoke 41, two opposed bearing cups 12 are received in the openings 42a such that the recessed areas 15 lie in the same plane as the machined surfaces 42b of the arms 42, as shown in FIGS. 5 and 6.

Figure 7:
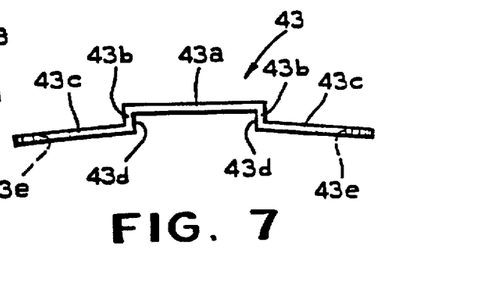
FIG. 7 is a side elevational view of the retainer strap illustrated in FIGS. 5 and 6 shown in an unstressed condition.

Means are provided for retaining the bearing cups 12 within the cylindrical openings 42a of the end yoke 41. As shown in FIGS. 5 through 7, such means includes a pair of retainer straps, indicated generally at 43 (only one is illustrated). The retainer straps 43 extend over the end surfaces 14 and the recessed areas 15 of the bearing cups 12. Each of the retainer straps 43 includes a central portion 43a connected by transition portions 43b to end portions 43c. As best shown in FIGS. 6 and 7, the end portions 43c lie in a plane which is offset from the plane defined by the central portion 43a. Thus, the transition portions 43b define lower shoulders 43d between the central portion 43a and the two end portions 43c. Apertures 43e are formed through the end portions 43c to permit threaded fasteners 44 to connect the retainer straps 43 to the arm 42 of the end yoke 41.

When the cross 11 is assembled to the end yoke 41, two opposed bearing cups 12 are received in the openings 42a, as mentioned above. Then, the retainer straps 43 are secured to the arm 42 by the threaded fasteners 44. When so secured, the lower surface of the central portion 43a lies across the end surface 14 of the bearing cup 12, while the end portions 43c lie across the recessed areas 15, as shown in FIG. 6. Also, the lower shoulders 43d of the retainer straps 43 engage the shoulders 15a defined on the end surface 14 of the bearing cup 12. Such engagement prevents rotation of the bearing cups 12 relative to the associated arms 42 of the end yoke 41.

As shown in FIG. 7, the end portions 43c of the retainer strap 43 may be formed at an angle relative to the central portion 43a thereof. In other words, the planes defined by the end portions 43c are not parallel to the plane defined by the central portion 43a. As a result, when the retainer strap 43 is secured to the arm 42 of the end yoke 41, the end portions 43c are flexed somewhat to the parallel position illustrated in FIG. 6. This flexing of the end portions 43a is useful in preloading the threaded fasteners 44. The additional force which is required to flex the end portions 43c causes the threaded fasteners 44 to additionally engage the threads of the bores in the yoke arm 42 which they are engaged greater than if no force was required to flex the end portions 43c. Because of this additional frictional engagement, the likelihood of the threaded fasteners 44 becoming loose during operation is reduced.

The angled formation of the end portions 43c is also helpful in accommodating stack-up tolerances in the universal joint assembly 40. Such stack-up tolerances result when a number of components, each having its own tolerance variations, are assembled together. In extreme instances, the combined effect of the tolerance variations can cause undesirable looseness in the universal joint assembly 40. The spring-like actions of the angled end portions 43c exert pressure on the end surfaces 14 of the bearing cups 12, urging them toward the cross member 11. As a result, any looseness in the assembly 40 is eliminated.

Figure 8:
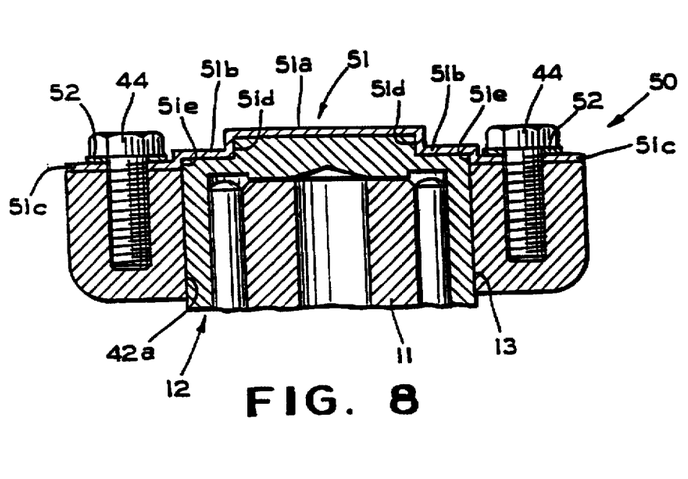
FIG. 8 is a sectional elevational view of a fourth embodiment of a universal joint assembly adapted for use with a full round end yoke in accordance with this invention.
Figure 9:
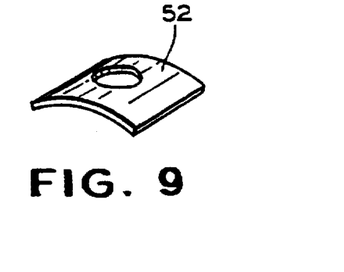
FIG. 9 is a side elevational view of the spring washer illustrated in FIG. 8 shown in an unstressed condition.

Referring now to FIGS. 8 and 9, there is illustrated a fourth embodiment of a universal joint assembly, indicated generally at 50, in accordance with this invention. The assembly 50 is generally similar to the third embodiment of the assembly 40 discussed above, except that the recessed areas 15 of the end surface 14 of the bearing cups 12 are not co-planar with the machined surfaces 42b formed about the openings 42 of the arms 42 of the full round end yoke 41. To accommodate this, a modified retainer strap, indicated generally at 51, is provided. The retainer strap 51 includes a central portion 51a, a pair of intermediate portions 51b, and a pair of end portions 51c. A first pair of shoulders 51d is defined between the central portion 51 and the intermediate portions 51b, while a second pair of shoulders 51e is defined between each of the intermediate portions 51b and the end portions 51c connected thereto. The first shoulders 51d engage the shoulders 15a on the bearing cups 12 to prevent relative rotation, as described above. The second shoulders 51e accommodate the different planes defined by the machined surfaces 42b and the recessed areas 15.

The end portions 51c of the retainer straps 51 are secured to the arms 42 of the yoke 41 by threaded fasteners 44, as described above. The end portions 51c of the retainer straps 51 may be formed at an angle relative to the central portion 51a, as described above in connection with the retainer strap 43. Alternatively, a spring washer 52 may be used to preload the threaded fasteners 44 to prevent loosening thereof. The structure of one of the spring washers 52 is illustrated in FIG. 9. As shown therein, the spring washer 52 is formed having a slightly arcuate shape when relaxed. When the threaded fasteners 44 are tightened, the spring washers 52 are flexed somewhat to the flat orientation illustrated in FIG. 8. This flexing exerts the preloading force on the threaded fasteners 44 similar to the manner described above.

Figure 10:
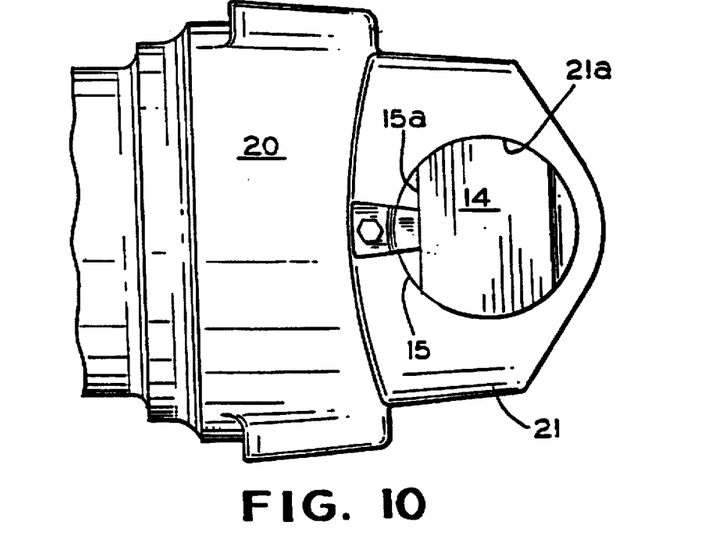
FIG. 10 is a plan view of a fifth embodiment of a universal joint assembly adapted for use with a full round end yoke in accordance with this invention.
Figure 11:
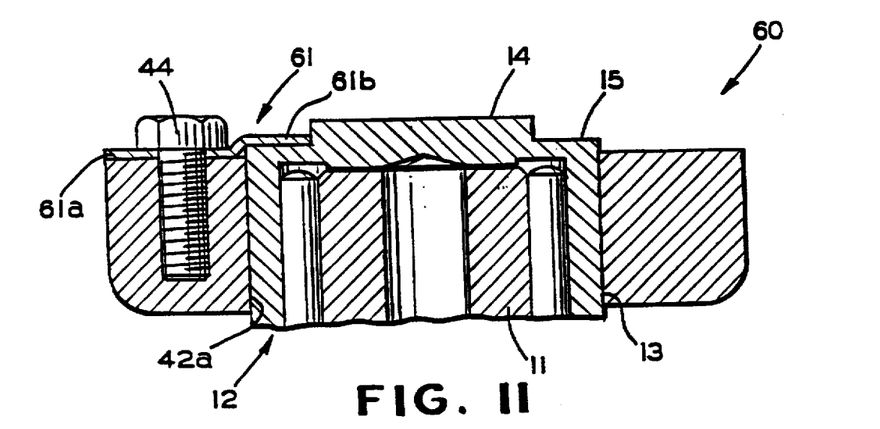
FIG. 11 is an enlarged sectional elevation view of the universal joint assembly illustrated in FIG. 10.

Referring now to FIGS. 10 and 11, there is illustrated a fifth embodiment of a universal joint assembly, indicated generally at 60, in accordance with this invention. The assembly 60 is generally similar to the fourth embodiment of the assembly 50 discussed above, except that the retainer strap 51 has been replaced by a retainer clip, indicated generally at 61. The retainer clip 61 includes a base portion 61a and an angled end portion 61b. The base portion 61a is secured to the arm 42 of the end yoke 41 by the threaded fastener 44. The angled end portion 61b extends over the recessed area 15 of the bearing cup 12. The edge of the end portion 61b engages the shoulder 15a. Because of its angled configuration, the retainer clip 61 functions in the same manner as the angled end portions 43c of the above-described retainer strap 43 to retain the threaded fastener 44 and to accommodate stack-up tolerances in the assembly 60. The retainer clip 61 can also be used in combination with a half round end yoke.

Figure 12:
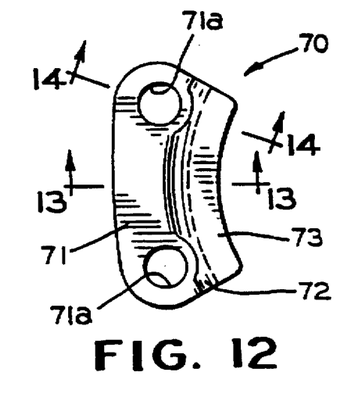
FIG. 12 is a top plan view of a modified version of a retainer clip adapted for use in the universal joint assembly of FIGS. 10 and 11.
Figure 13:
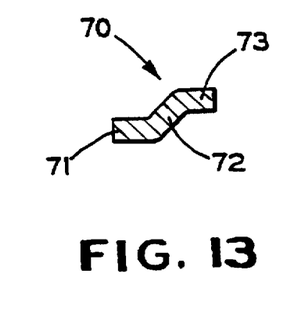
FIG. 13 is a sectional elevational view of the modified retainer clip taken along line 13—13 of FIG. 12.
Figure 14:
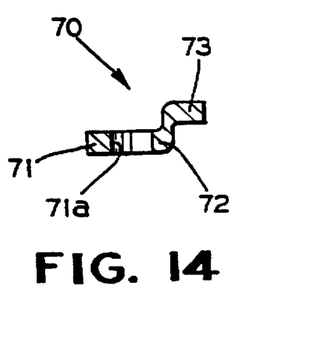
FIG. 14 is a sectional elevational view of the modified retainer clip taken along line 14—14 of FIG. 12.

Referring now to FIGS. 12 through 14, there is illustrated an alternate design for a retainer clip, indicated generally at 70, adapted for use in the fifth embodiment of the universal joint assembly 60 in lieu of the retainer clip 61. The retainer clip 70 includes a base portion 71, a transition portion 72 and an end portion 73. The base portion 71 has a pair of openings 71a formed therethrough to permit it to be secured to the arm 42 of the end yoke 41 by a pair of threaded fasteners (not shown). The end portion 73 extends over the recessed area 15 of the bearing cup 12. The edge of the end portion 73 is curved, unlike the above-described retainer clip 61. Therefore, the edge of the end portion 73 of the retainer clip 70 may, but does not necessarily, engage the shoulder 15a formed on the bearing cup 12. As shown in FIGS. 13 and 14, the thickness of the transition portion 72 varies between a maximum near the center thereof and a minimum adjacent to the openings 71a. The retainer clip 70 functions in the same general manner as the retainer clip 61.

Figure 15:
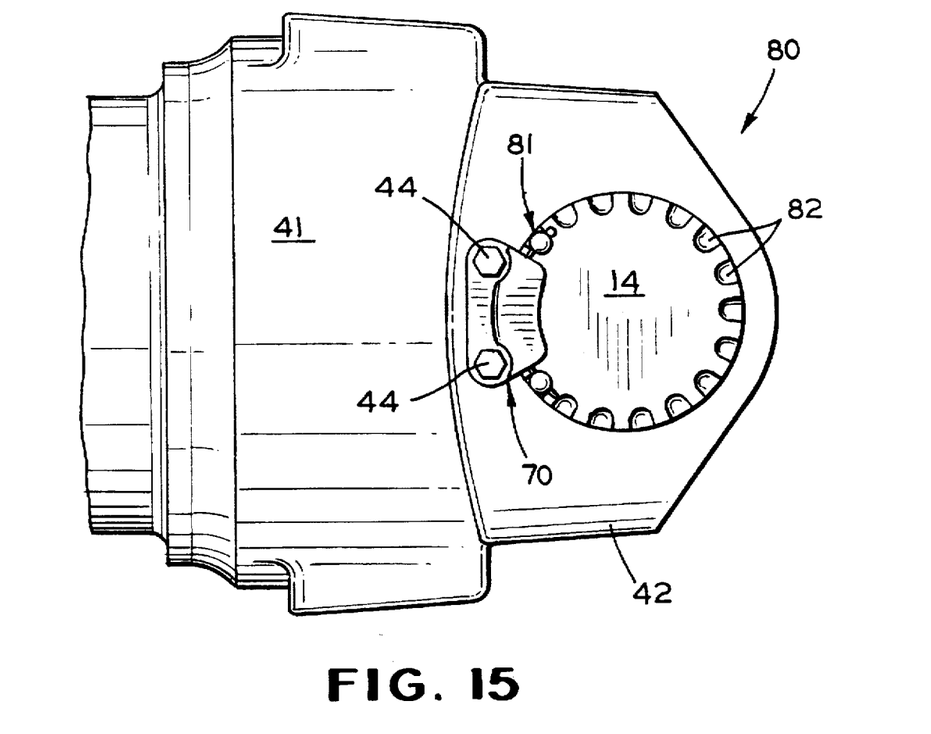
FIG. 15 is a plan view of a sixth embodiment of a universal joint assembly adapted for use with a full round end yoke in accordance with this invention.
Figure 16:
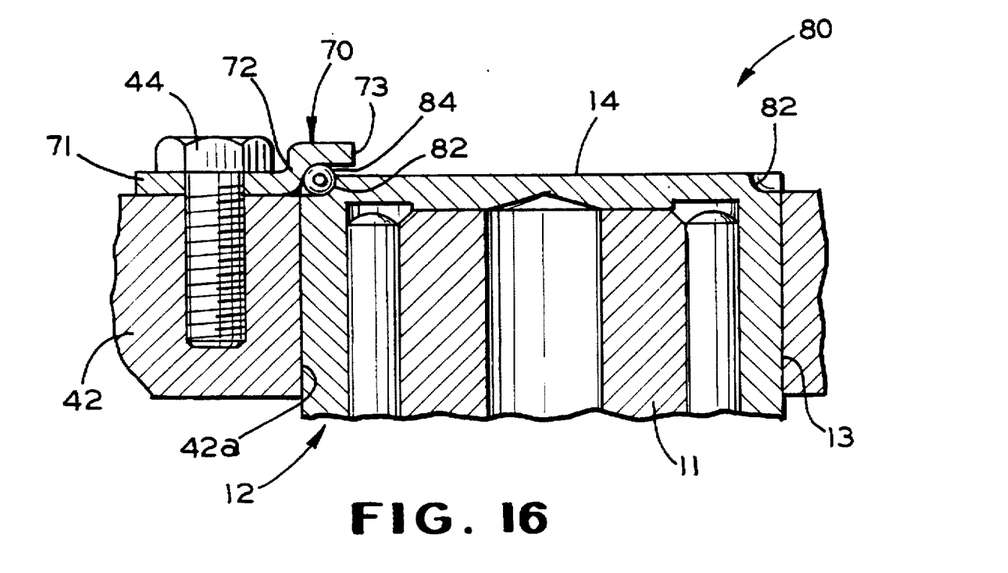
FIG. 16 is an enlarged sectional elevation view of the universal joint assembly illustrated in FIG. 15.

A sixth embodiment of a universal joint assembly, indicated generally at 80, in accordance with this invention is illustrated in FIGS. 15 and 16. The assembly 80 is generally similar to the fifth embodiment of the assembly 60 discussed above, except that retainer clip 61 has been replaced by retainer clip 70, a retainer wire and sphere subassembly indicated generally at 81 has been added, and the end surface 14 of the bearing cup 12 has been modified as described below.

Unlike the previous embodiments, the end surface 14 of the bearing cup 12 is illustrated as a generally planar surface lacking the recessed areas 15 and shoulders 15a described above. Preferably, at least one depression 82 is formed in the end surface 14 near the circumference of the end surface 14. More preferably, a series or pattern of depressions 82 are formed and selectively spaced about the circumference of the end surface 14. Each depression 82 can be semi-circular or other desired shape of a predetermined depth.

The base portion 71 of the retainer clip 70 is secured to the arm 42 of the end yoke 41 by a pair of threaded fasteners 44. The end portion 73 of the retainer clip 70 extends over the end surface 14 to retain the bearing cup 12 in the opening 42a of the arm 42.

Figure 17:
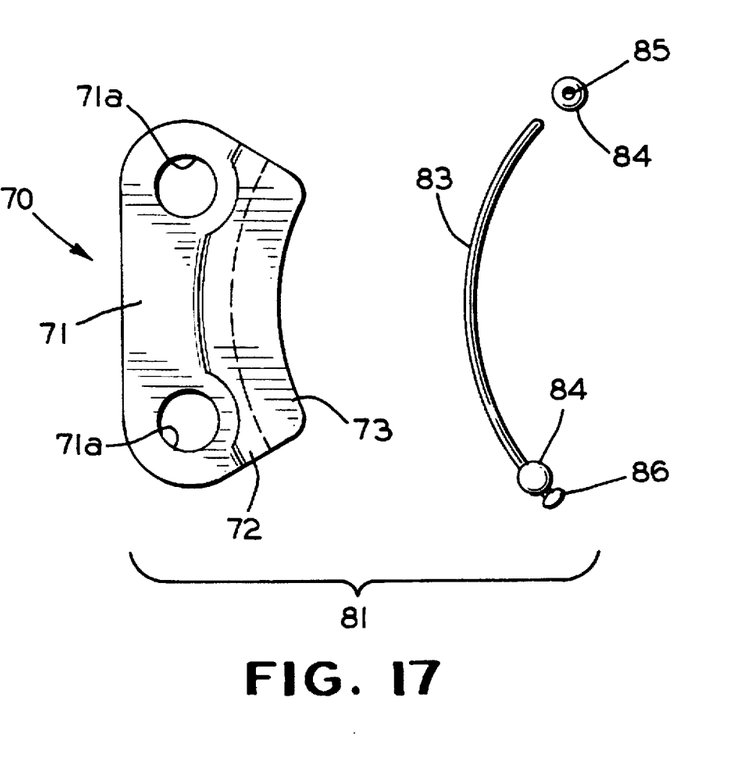
FIG. 17 is an enlarged top plan view of a retainer wire and sphere subassembly removed from the universal joint assembly of FIGS. 15 and 16, wherein one sphere has been removed from the retainer wire for clarity of illustration.

The retainer wire and sphere subassembly 81, illustrated separately in FIG. 17, is adapted for use with the retainer clip 70 to prevent rotation of the bearing cup 12 relative to the arm 42 of the yoke 41. The subassembly 81 includes a retainer wire 83 mounting at least one trappable element illustrated as a sphere 84. The retainer wire 83 can be formed from any desired flexible material. The length of the retainer wire 83 in a preferred embodiment is selected to be greater than an associated length of the retainer clip 70.

Preferably, at least one sphere 84 is threaded onto the retainer wire 83. The spheres 84 and depressions 82 are sized so that each depression 82 can receive and seat one sphere 84. Each sphere 84 has an opening 85 of a diameter slightly larger than the diameter of the retainer wire 83. Preferably, the spheres 84 are loosely threaded on the retainer wire 83 so that each sphere 84 can be positioned along the length of the retainer wire 83 as described below. After the spheres 84 are threaded onto the retainer wire 83, each end of the retainer wire 83 is enlarged or the like as indicated at 86 to prevent the spheres 84 from sliding off the retainer wire 83.

In use, the retainer wire and sphere subassembly 81 is positioned between the end portion 73 and the end surface 14 of the bearing cup 12. Preferably, the wire 83 is placed adjacent the transition portion 72. As the retainer clip 70 is secured to the arm 42 of the end yoke 41 by fasteners 44, at least one sphere 84 is slid along the length of the retainer wire 83 so that it is seated in a depression 82 and trapped between the retainer clip 70 and the end surface 14 as illustrated in FIG. 16. In this manner, an interference fit created by the trapped sphere 84 prevents the bearing cup 12 from rotating relative to the arm 42.

In other embodiments, the subassembly 81 can be slid with respect to the retainer clip 70 to seat a sphere 84, as opposed to sliding a sphere 84 as discussed above. In yet other embodiments, an anti-rotation element of a shape other than a sphere can be substituted for spheres 84. For example, a rectangular element can be threaded onto the retainer wire 83 to be seated in a depression 82 between the retainer clip 70 and the end surface 14 to prevent rotation of the bearing cup 12.

The pattern of depressions 82 facilities a quick assembly of the universal joint assembly 80. During assembly of the bearing cup 12 on a trunnions 11, it is not necessary to align the bearing cup 12 at a particular orientation with respect to the trunnions 11 or arm 42. Travel of the spheres 84 along the length of the retainer wire 83 permits the spheres 84 to be positioned to nearby depressions 82. It is desirable that both spheres 84 of subassembly 81 are trapped between the retainer clip 70 and the end surface 14.

Figure 18:
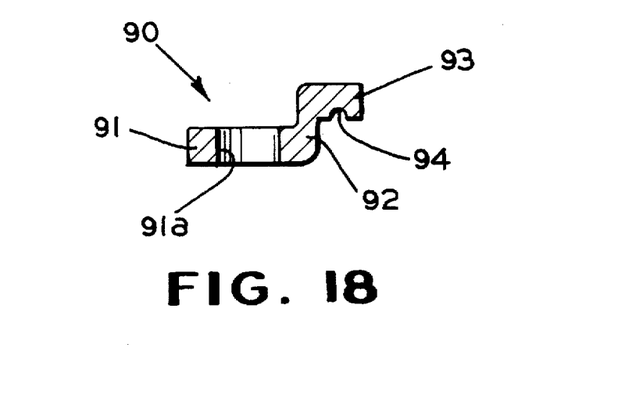
FIG. 18 is a sectional elevational view of a modified retainer clip adapted for use with the retainer wire and sphere subassembly illustrated in FIG. 17.

A modified retainer clip indicated generally at 90 is illustrated in FIG. 18. The retainer clip 90 is similar to retainer clip 70 except for the inclusion of a groove 94 formed in a lower surface of an end portion 93. Preferably, the groove 94 is sized to receive the retainer wire 83.

In use, the retainer clip 90 is substituted for the retainer clip 70 in the embodiment of the universal joint assembly 80 illustrated in FIGS. 15 and 16. A base portion 91 of the retainer clip 90 is secured to the arm 42 of the end yoke 41 by a pair of threaded fasteners 44 received in openings 91a. The end portion portion 93 extends over the end surface 14 to retain the bearing cup 12 in the opening 42a of the arm 42. The retainer wire and sphere subassembly 81 is placed between the retainer clip 90 and the end surface 14 so that the retainer wire 83 is received in the groove 94 and spheres 84 are located on opposite sides of the retainer clip 90, similar to the position of the subassembly 81 in FIG. 15. In this position, spheres 84 can be slid along the length of the retainer wire 83 and seated in nearby depressions 82 in the end surface 14. It is not necessary to trap a sphere 84 between the end surface 93 and the end surface 14 to prevent the bearing cup 12 from rotating relative to the arm 42. The seated spheres 84 act as stops against the end surface 93 to prevent rotation of the bearing cup 12.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A universal joint assembly comprising:

a yoke including an arm having an opening formed therethrough;

a cross including an outwardly extending trunnions;

a bearing cup rotatably mounted on said trunnions and disposed within said yoke arm opening;

a retainer clip including a base portion secured to said yoke arm and an end portion extending over a portion of said bearing cup to retain it within said yoke arm opening;

a retainer wire disposed between said retainer clip and said bearing cup; and at least one element secured to said retainer wire and engaging a portion of said bearing cup to prevent said bearing cup from rotating relative to said yoke arm.

2. The universal joint assembly defined in claim 1 wherein said element is a sphere.

3. The universal joint assembly defined in claim 1 wherein a depression is formed in said bearing cup to receive said element.

4. The universal joint assembly defined in claim 1 wherein a plurality of depressions is formed in said bearing cup to permit said element to be received in a selective one of said depressions.

5. The universal joint assembly defined in claim 1 wherein said retainer clip has a groove formed therein to receive said retainer wire.

6. The universal joint assembly defined in claim 1 wherein said at least one element comprises a pair of elements are secured to said retainer wire and engage portions of said bearing cup to prevent said bearing cup from rotating relative to said yoke arm.

7. The universal joint assembly defined in claim 6 wherein each of said elements is a sphere.

8. The universal joint assembly defined in claim 6 wherein a depression is formed in said bearing cup to receive each of said elements.

9. The universal joint assembly defined in claim 6 wherein a plurality of depressions is formed in said bearing cup to permit said elements to be received in a selective pair of said depressions.

10. The universal joint assembly defined in claim 6 wherein said retainer clip has a groove formed therein to receive said retainer wire.

* * * * *